US010371043B2

(12) United States Patent
Blahovic et al.

(10) Patent No.: US 10,371,043 B2
(45) Date of Patent: Aug. 6, 2019

(54) EXHAUST GAS SUPPLY ARRANGEMENT OF AN EXHAUST GAS TURBOCHARGER

(71) Applicants: BorgWarner Inc., Auburn Hills, MI (US); MAN Truck & Bus AG, Munich (DE)

(72) Inventors: Eduard Blahovic, Stein (DE); Fabian Rasch, Nuremberg (DE); Nicolas Regent, Alzey (FR)

(73) Assignees: BorgWarner Inc., Auburn Hills, MI (US); MAN Truck & Bus AG, Munich (DE)

( * ) Notice: Subject to any disclaimer, the term of this patent is extended or adjusted under 35 U.S.C. 154(b) by 39 days.

(21) Appl. No.: 15/564,753

(22) PCT Filed: Apr. 8, 2016

(86) PCT No.: PCT/US2016/026551

§ 371 (c)(1),
(2) Date: Oct. 6, 2017

(87) PCT Pub. No.: WO2016/164661

PCT Pub. Date: Oct. 13, 2016

(65) Prior Publication Data

US 2018/0209327 A1 Jul. 26, 2018

(30) Foreign Application Priority Data

Apr. 9, 2015 (DE) ........................ 10 2015 206 327

(51) Int. Cl.
*F02B 37/02* (2006.01)
*F01D 9/02* (2006.01)

(52) U.S. Cl.
CPC ............ *F02B 37/025* (2013.01); *F01D 9/026* (2013.01); *F05D 2220/40* (2013.01); *F05D 2240/91* (2013.01); *Y02T 10/144* (2013.01)

(58) Field of Classification Search
CPC ........ F02B 37/004; F02B 37/22; F02B 39/00; F05D 2220/40; F01N 13/10; F01N 13/1805; F01N 2260/14; F01N 2340/06
See application file for complete search history.

(56) References Cited

U.S. PATENT DOCUMENTS 4,177,006 A 12/1979 Nancarrow
5,406,795 A * 4/1995 Raub ...................... F01D 9/026
415/213.1

(Continued)

FOREIGN PATENT DOCUMENTS

EP 0664385 A1 7/1995
EP 1862653 A1 12/2007

OTHER PUBLICATIONS

Written Opinion and International Search Report dated Jun. 16, 2016, in International Application No. PCT/US2016/026551.

*Primary Examiner* — Long T Tran
(74) *Attorney, Agent, or Firm* — Eric L. Doyle; Stephan A. Pendorf; Patent Central LLC

(57) ABSTRACT

An exhaust gas supply arrangement (1) to a turbine wheel (11) of an exhaust gas turbocharger (2), having a flange (14) for connecting to a manifold (3) of an internal combustion engine (4), an exhaust gas supply leading from the flange (14) to the turbine wheel (11), and a partition (13) which divides the exhaust gas supply into two channels (12), wherein, in a top view of the flange (14), a coordinate system is defined, the origin thereof lying in the center of the partition (13), the y-axis thereof following the partition (13) and the x-axis thereof being perpendicular to the y-axis.

19 Claims, 5 Drawing Sheets

(56) References Cited

U.S. PATENT DOCUMENTS

Figure 1:
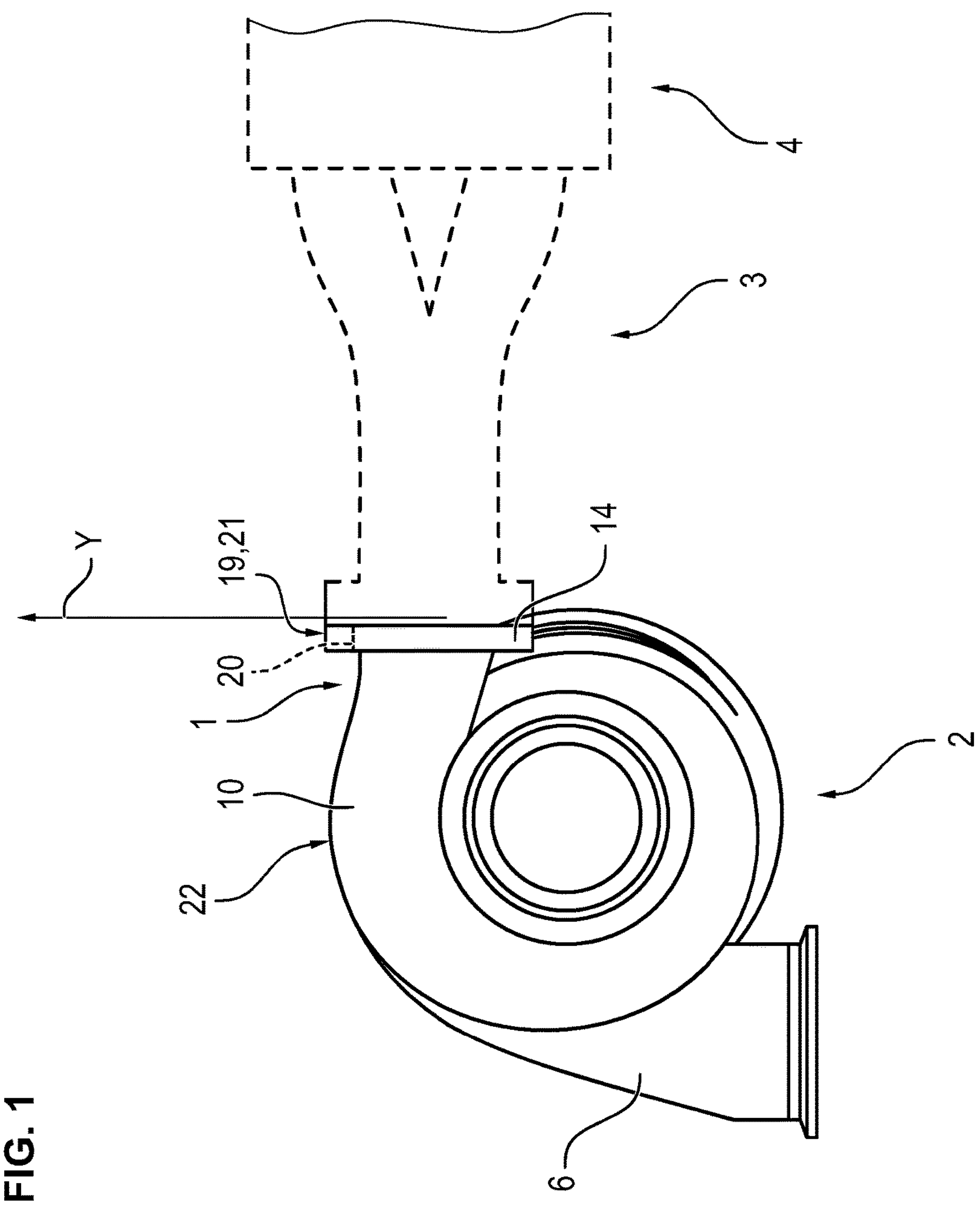

| | | | | |
|---|---|---|---|---|
| 6,709,235 | B2 * | 3/2004 | Hosny | F01D 9/026 415/205 |
| 6,892,532 | B2 * | 5/2005 | Bruce | F01N 13/10 60/280 |
| 7,287,373 | B2 * | 10/2007 | Matsuda | F01N 3/046 60/320 |
| 2003/0053910 | A1 | 3/2003 | Hosny | |
| 2007/0137200 | A1 | 6/2007 | Rammer et al. | |
| 2009/0026009 | A1 * | 1/2009 | Itoh | F01N 13/107 181/227 |
| 2014/0366525 | A1 * | 12/2014 | Wagner | F02B 37/025 60/598 |
| 2016/0034196 | A1 * | 2/2016 | Fanning | G06F 12/0246 711/103 |

* cited by examiner

EXHAUST GAS SUPPLY ARRANGEMENT OF AN EXHAUST GAS TURBOCHARGER

The invention relates to an exhaust gas supply arrangement to a turbine wheel of an exhaust gas turbocharger and an exhaust gas turbocharger with the corresponding exhaust gas supply arrangement.

By means of the exhaust gas supply arrangement, the exhaust gas is guided from the end of a manifold of an internal combustion engine up to the turbine wheel of the exhaust gas turbocharger. Generally, the exhaust gas supply arrangement is an integral component of the turbine housing. In the present case, two channel exhaust gas supply arrangements are considered. In these two channel arrangements, the exhaust gas supply arrangement is divided into the two channels by a partition. This may thereby be a twin-channel arrangement or a double-channel arrangement. The exhaust gas supply arrangement is generally connected to the manifold via a flange. The load at the flange, in particular the thermal load, is at points so great that tears have developed in certain arrangements. This problem and first approaches for a solution are described, for example, in document EP 0 664 385 A1.

It is the object of the present invention to describe an exhaust gas turbocharger which enables sustained and low maintenance operation and is inexpensive to manufacture and mount. In particular, the flange of the exhaust gas supply arrangement is to be able to sustainably withstand the operating loads.

The solution to this problem is carried out be the features of claim 1. The dependent claims have advantageous embodiments of the invention as their subject matter.

The problem is thus solved by an exhaust gas supply arrangement of a turbine wheel of an exhaust gas turbocharger. This exhaust gas supply arrangement has a flange for connection to a manifold of an internal combustion engine. An exhaust gas supply runs from the flange to the turbine wheel. This exhaust gas supply is divided into two channels by a partition. The partition begins at the flange and extends until shortly before the turbine wheel. In this case, in particular, an exhaust gas turbocharger with a twin channel arrangement is considered. In the twin channel arrangement, the two channels always run parallel to one another and arrive at the turbine wheel next to one another. The embodiment of the flange according to the invention is, however, also applicable for a double channel arrangement. In the double channel arrangement, the channels run initially parallel to one another and then arrive at the turbine wheel offset, for example, by 180°. In both arrangements, the partition begins in the region of the flange and thus a division into two channels. Thus, thermal loads discussed here arise in both arrangements in the region of the flange.

A coordinate system is defined for a more precise description of the geometry and the embodiment of the flange according to the invention. In a top view of the flange, the origin of this coordinate system lies in the center of the partition. The coordinate system is defined by that surface which abuts at the manifold of the internal combustion engine. In the following, we constantly describe this surface, even through the "flange" is generally discussed. The y-axis of the coordinate system follows the partition. The y-axis is perpendicular to the x-axis. In particular, the origin of the coordinate system lies in the center of the partition. All lengths and radii are measured a few millimetres in the interior of the flange so that casting radii or chamfers remain discounted.

It is preferably provided that the exhaust gas supply arrangement is an integral component of a turbine housing of the exhaust gas turbocharger. The turbine housing is, in particular, a cast component.

The flange advantageously has an essentially rectangular base shape. The two sides parallel to the x-axis are defined as X-outer sides. Two Y-outer sides stand perpendicular thereto and parallel to the y-axis. The X-outer sides and Y-outer side do not have to be straight sides, but instead merely describe the essentially rectangular base shape of the flange.

Within the context of the invention, it has been taken into account that the exhaust gas supply runs curved from the flange to the turbine wheel. Thus, there is an X-outer side of the flange which is assigned to the curve outer side. This may also be described as the radially outward X-outer side. The opposite X-outer side is assigned to the curve inner side. Within the context of the invention, in particular, by means of many simulation calculations, it has been recognized that the greatest thermal loads occur, in particular, on the curve outer side. Therefore, an asymmetrical configuration of the flange is proposed within the context of the invention.

It is thus preferably provided that the flange is asymmetric with respect to the x-axis. Additionally or alternatively, the cross sections of both channels are different such that the flange is asymmetric with respect to the y-axis. In addition, it is preferably provided that the individual channel is asymmetric with respect to each straight line parallel to the y-axis. Additionally or alternatively, the individual channel is asymmetric with respect to each straight line parallel to the x-axis. Due to this asymmetric configuration, it may be considered during the design of the flange and the exhaust gas supply arrangement, that higher thermal demands occur radially outward depending on the curved progression of the exhaust gas supply.

It is further preferably provided that the flange has at least one reinforcement on one of the X-outer sides in the form of an elevation, wherein this elevation is formed in the center of the X-outer side. In particular, the elevation is arranged symmetrical to the y-axis.

As already described, the greatest thermal load occurs on the curved outer side (radially outward). Therefore, it is particularly provided that the elevation is formed solely on that X-outer side which is assigned to the curve outer side.

The elevation has an elevation radius ER. The elevation radius ER is preferably 10 to 50 mm, in particular 15 to 45 mm, particularly preferably 20 to 40 mm.

It is additionally preferably provided that the elevation has an elevation width EB. The elevation width is defined as perpendicular to the y-axis. The entire flange has a flange width FB perpendicular to the y-axis. It is measured at the widest point. It is preferably provided that the elevation width EB is 0.2 to 0.7 times, in particular 0.3 to 0.5 times the flange width FB.

These different dimensions of the elevation were determined in different simulations and tests, and provide good values for a flange-stabilizing elevation. In particular, this elevation increases the rigidity of the flange and thermal inertia in this region. On the basis of the arrangement of the elevation on the X-outer side and the arrangement of the partition along the y-axis, a relative positioning of the elevation to the partition is defined.

It is advantageously provided that the elevation transitions on both sides into a trough. The elevation width EB is then particularly defined from trough bottom to trough bottom. The two troughs each transition into a side elevation of the X-outer side. These side elevations form the correspondingly necessary surfaces for mounting holes, which are usually formed in the four corners of the flange. The flange is screwed to the opposing flange of the manifold via these mounting holes. Due to the embodiment of the elevation with the two troughs and the two side elevations, a wave-shaped form arises on this one X-outer side.

The two troughs advantageously each have a trough radius TR. The trough radius TR is preferably at least 20 mm, in particular at least 25 mm, particularly preferably at least 30 mm. Thus, the trough radius TR and the elevation radius ER have the same magnitude, and a clearly formed wave structure arises.

A thickness D of the partition is preferably defined at the thinnest point of the partition, wherein the thickness D is between 6 and 16 mm, preferably between 8 and 14 mm.

Furthermore, a so-called flange thickness or flange thicknesses are defined on the flange. These are measured perpendicular to the x-axis. A first flange thickness FS1 is defined between the individual channel and the at least one X-outer side. This first flange thickness FS1 is measured in particular from the bottom of the respective trough up to the channel and parallel to the y-axis. The first flange thickness FS1 is preferably 60% to 190%, in particular 80% to 170%, particularly preferably 100% to 150% of the thickness D of the partition.

Additionally or alternatively to the just described elevation in the X-outer side of the flange, the cross section of the individual channel is newly configured. This configuration of the individual channel may be used in addition to or alternatively to the configuration of the elevation. Within the context of simulations, it has proven that both the elevation and also the configuration of the individual channel taken separately provide an advantage with respect to the durability of the flange. Particularly advantageous results arose from the combination of these two measures.

The individual channel has an essentially rectangular or oval cross section. At the individual channel in the top view of the flange, the following sides and transitions are defined. The "X-sides" run essentially parallel to the x-axis. The "Y-sides" run essentially parallel to the y-axis.

The individual channel has a first Y-channel side which is defined at the partition. A first X-channel side is, under consideration that the exhaust gas supply runs curved from the flange to the turbine wheel, assigned to the curve outer side. The first Y-channel side lies opposite to a second Y-channel side. A first transition leads from the first Y-channel side into the first X-channel side. A second transition leads from the first X-channel side into the second Y-channel side. A third transition leads from the second Y-channel side into a second X-channel side. A fourth transition leads from the second X-channel side into the first Y-channel side.

Within the context of the invention, it is preferably provided that the first transition (from the first Y-channel side into the first X-channel side) has two individual curves and thus two radii (first radius R1 and second radius R2). Generally, such transitions merely have one radius. Within the context of the invention, however, it was recognized that thermal load may be reduced by the use of two smaller curves. The two radii R1, R2 may have the same size.

The exact configuration of the first transition provides that a connection is advantageously arranged between the two radii. I.e., the end of one radius does not directly meet the end of the second radius, but instead the two radii are connected to one another via a straight line or via an additional curve. The additional curve thereby has, however, a radius which is much larger than the first or second radius.

It is particularly provided, if the connection is designed as a curve, that this curve has a radius of at least 3*R1 or 3*R2.

The connection between the two radii at the first transition has a connection length. In the configuration of the connection as a straight line, this length is naturally the length of the straight line. If the connection is configures as a curve with a large radius, then the curve length is defined as the connection length. It is advantageously provided that the connection length is at most b*½(R1+R2), where b is a maximum of 2, preferably a maximum of 1, particularly preferably is maximally 0.5. b may also be 0, such that no connection is arranged between the two radii R1, R2, but instead the two radii transition directly into one another. The two radii R1, R2 preferably have two different center points.

Moreover, it is preferably provided that the connection designed as a straight line has a specific angle $\alpha$ with respect to the y-axis. If the connection is configured as a curve with a large radius, then the angle of the tangent of the curve is measured with respect to the y-axis. The tangent thereby intersects the curve in the center of the curve. The angle $\alpha$ is preferably between 45° and 85°. It is particularly preferably provided that the angle $\alpha$ is between 50° and 75°, particularly between 55° and 70°.

Due to the two relatively small radii R1, R2 at the first transition and due to the preferred connection used between the two radii R1, R2, there arises a relatively extended first transition. Tests and calculations have proven that an improvement with respect to the rigidity and thermal inertia of the flange arises from this.

Advantageously, an upper limit and a lower limit are defined for the first radius R1 and for the second radius R2. The lower limit lies preferably at 5 mm, particularly at 8 mm, particularly preferably at 10 mm. The upper limit is particularly 20 mm, preferably 16 mm, particularly preferably 14 mm.

As already described, the first radius R1 and the second radius R2 may be the same size. However, the calculations demonstrate that a certain deviation between the two radii may have advantageous effects. It is thus preferably provided that the first radius R1 is 65% to 150%, preferably 75% to 130%, particularly preferably 80% to 120% of the second radius R2.

The second transition and/or the third transition may be formed as is conventional in the prior art, by one corresponding radius, defined in this case as third radius R2. Within the context of the invention, it was recognized that the third radius is to be advantageously between 5 and 20 mm, in particular between 8 and 15 mm.

The fourth transition is preferably defined by a fourth radius R4. The fourth radius R4 is advantageously between 10 and 30 mm, in particular between 12 and 25 mm.

It is further preferred if the third radius R3 is larger than the first radius R1 and larger than the second radius R2. The fourth radius R4 is preferably larger than the third radius R3.

Advantageously, the two radii R1, R2 are selected as a function of the width of the individual channel or the width of the channel is selected as a function of the corresponding advantageous radii. It is thus preferably provided that a width B of the individual channel is defined at the widest point at the flange. The width B is measured parallel to the x-axis. The width B is defined as a function of the two radii R1, R2: B=a*(R1+R2), wherein it is preferably provided that a is between 0.8 and 1.8, preferably between 1.0 and 1.7.

A height H of the individual channel is defined at the tallest point at the flange parallel to the y-axis. The height H is advantageously 1.3 to 1.7 times the width B.

The first Y-channel side and/or the second Y-channel side preferably run parallel to the y-axis advantageously with a deviation of maximally 10°. The first X-channel side and/or the second X-channel side preferably run parallel to the x-axis advantageously with a deviation of maximally 10°.

Furthermore, it is preferably provided that the first X-channel side is a straight line or a curve between the first transition and the second transition. In the embodiment as a curve, a very large radius is selected which is substantially larger than the second radius R2 or the third radius R3. The straight line between the two transitions runs parallel to the x-axis advantageously with a maximum deviation of 10°. In an embodiment of the first X-channel side as a curve, the tangent in the center of the curve is considered in this case. This tangent then runs parallel to the x-axis with a deviation of max. 10°.

The invention further comprises an exhaust gas turbocharger with the just described exhaust gas supply arrangement. The advantageous embodiments and subclaims described in the scope of the exhaust gas supply arrangement have corresponding advantageous application for the exhaust gas turbocharger according to the invention.

Figure 2:
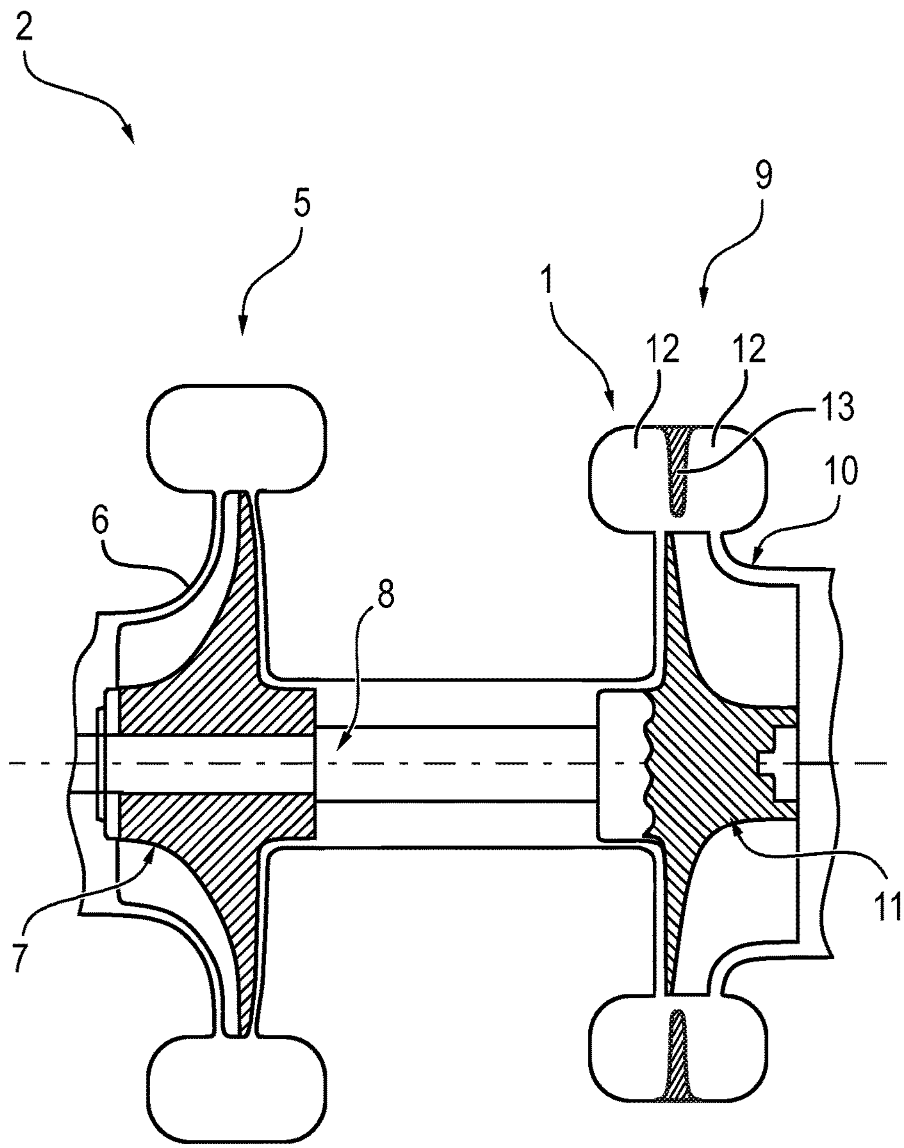
Figure 3:
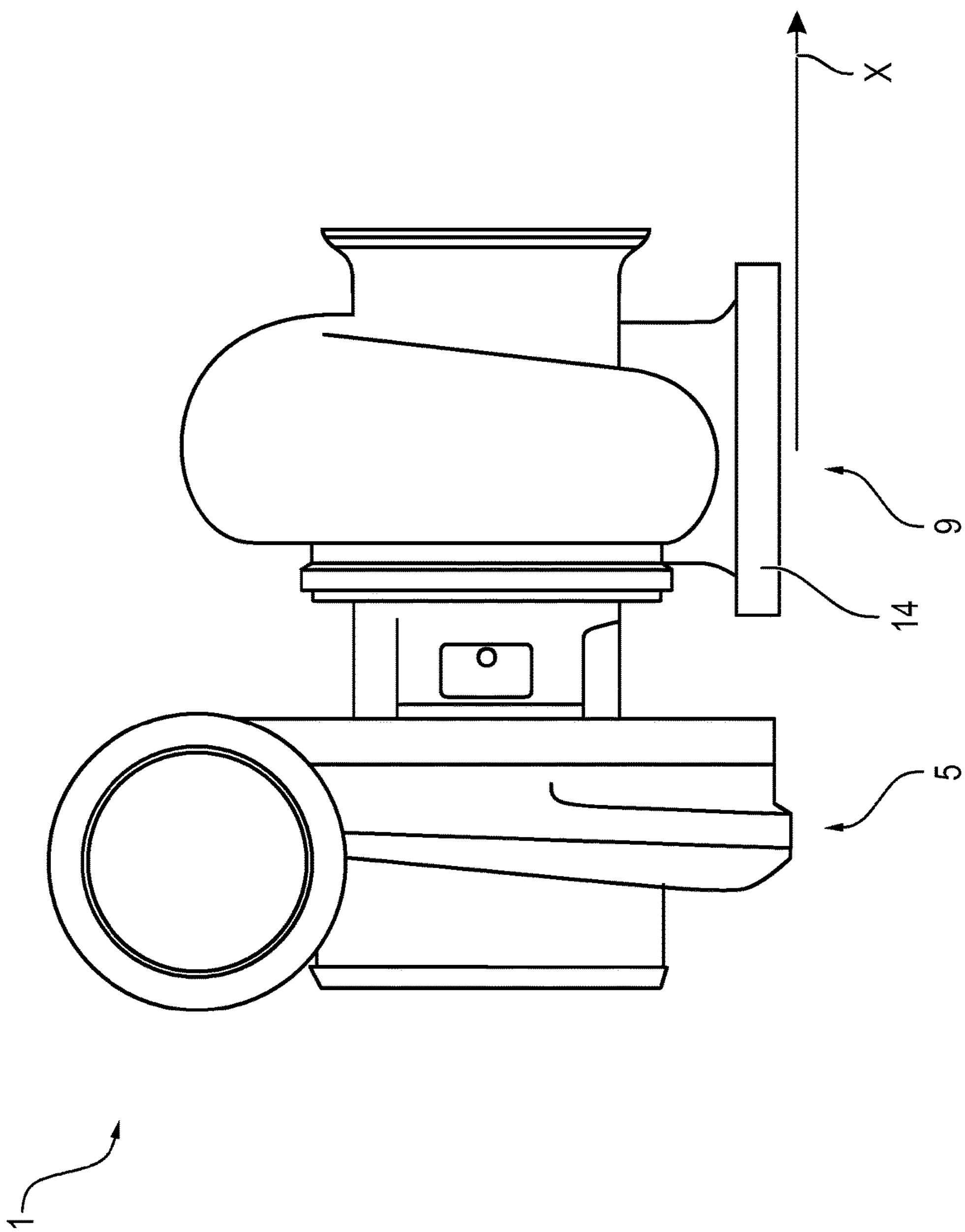
Figure 4:
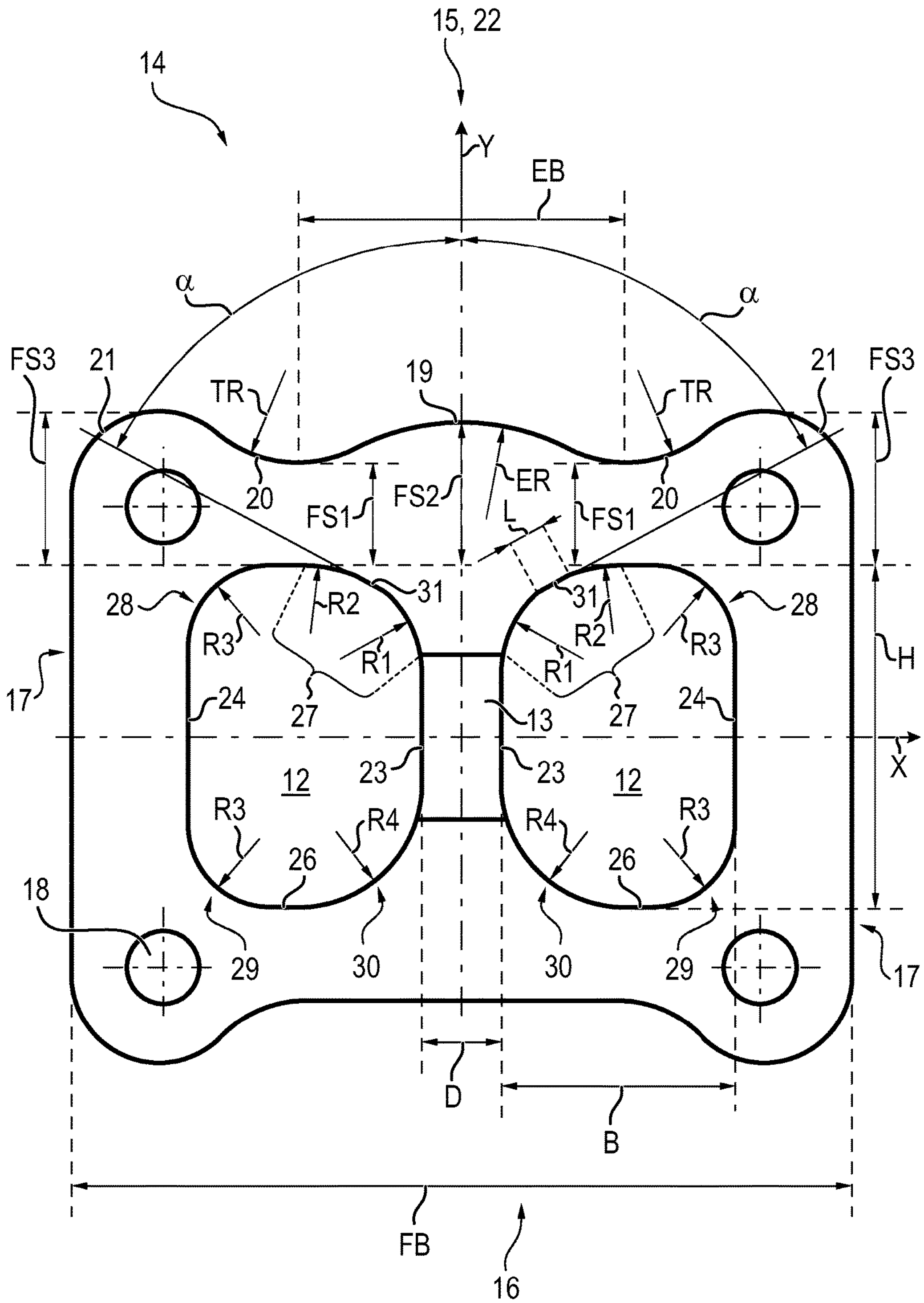
Figure 5:
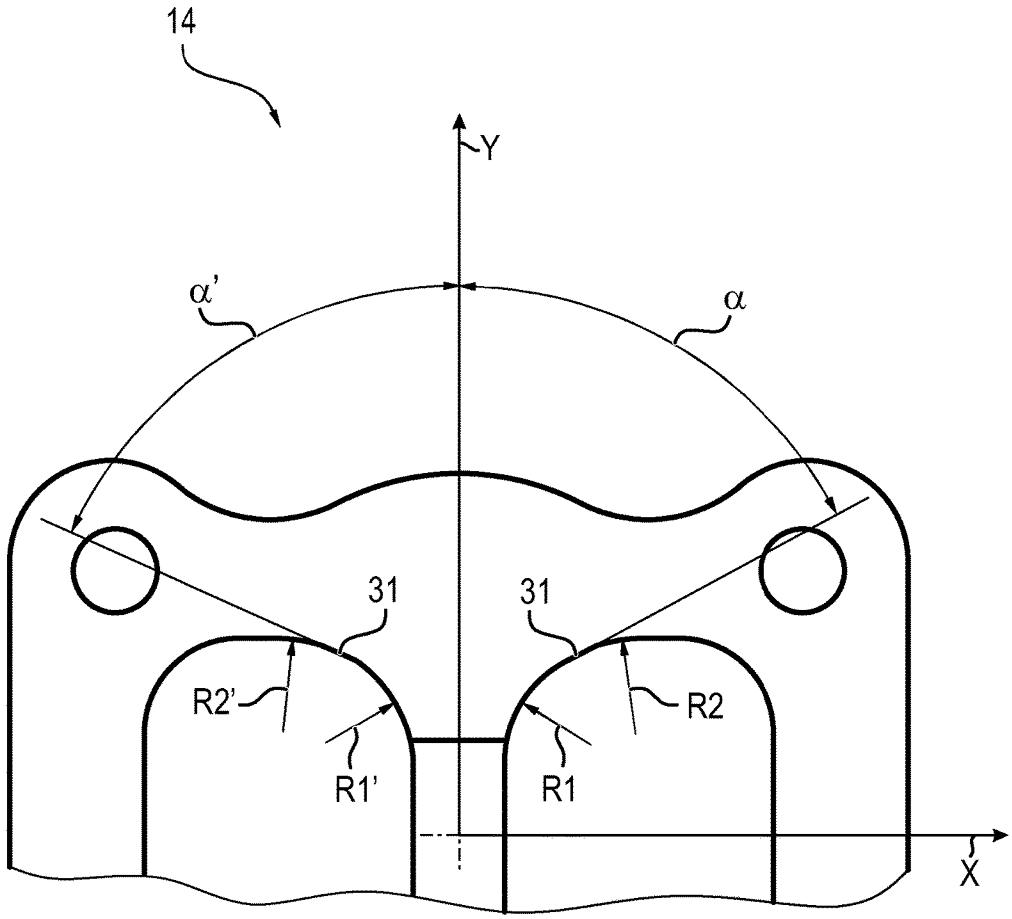

Additional details, advantages, and features of the present invention arise from the subsequent description of embodiments with reference to the drawings:

FIG. 1 shows an exhaust gas turbocharger with an exhaust gas supply arrangement according to the invention according to two embodiments in an arrangement with an internal combustion engine, FIG. 2 shows the exhaust gas turbocharger with the exhaust gas supply arrangement according to the invention according to two embodiments in a schematically simplified view, FIG. 3 shows a side view of the exhaust gas turbocharger with the exhaust gas supply arrangement according to the invention according to the two embodiments, FIG. 4 shows a flange of the exhaust gas supply arrangement according to the invention of the first embodiment in detail, and FIG. 5 shows a flange of the exhaust gas supply arrangement according to the invention of the second embodiment in detail.

FIG. 1 shows an exhaust gas turbocharger 2. A schematically simplified side view of exhaust gas turbocharger 2 is shown in FIG. 2. FIG. 3 shows an additional view of exhaust gas turbocharger 2.

According to FIG. 1, exhaust gas turbocharger 2 is connected to an internal combustion engine 4 via a manifold 3. Manifold 3 and internal combustion engine 4 are shown, in particular, purely schematically. Manifold 3 has two tubes which bring the exhaust gas from different cylinders into the two channels of the manifold.

According to FIG. 2, exhaust gas turbocharger 2 has a compressor 5. Compressor 5 comprises a compressor housing 6. A compressor wheel 7 is arranged in compressor housing 6. Compressor wheel 7 sucks air in axially and compresses it radially outward. The compressed air is guided to internal combustion engine 4.

A turbine 9 of exhaust gas turbocharger 2 comprises a turbine housing 10. A turbine wheel 11 is arranged in turbine housing 10. Two channels 12 provide flow past turbine wheel 11. The two channels 12 are thereby separated from one another by a partition 13.

Turbine wheel 11 is connected to compressor wheel 7 via a shaft 8. By driving turbine wheel 11 by means of exhaust gas, shaft 8 and compressor wheel 7 are thus set into rotation.

An exhaust gas supply arrangement 1 of turbocharger 2 leads, as an integral component of turbine housing 10, from a flange 14 in a curved shape up to turbine wheel 11. FIGS. 1 to 3, in particular, show this.

FIG. 4 shows flange 14 of exhaust gas supply arrangement 1 according to the first embodiment. The surface of flange 14 shown in FIG. 4 abuts at manifold 3.

An origin of a coordinate system lies in the center of flange 14. The x-axis extends perpendicular to partition 13. The x-axis in the example of the twin channel arrangement shown here is parallel to shaft 8. The y-axis of the coordinate system is perpendicular to the x-axis. In the following, the configuration of flange 14 is described in particular in the plane of this coordinate system.

Flange 14 has an essentially rectangular base shape. The upper and lower sides of the flange represented in FIG. 4 are designated as first X-outer side 15 and second X-outer side 16. If one considers the depiction in FIG. 1, it arises that exhaust gas supply arrangement 1 runs in a curve up to turbine wheel 11. Thus, a curve outer side 22 arises. First X-outer side 15 in FIG. 4 faces this curve outer side 22. The greatest thermal demands in the region of flange 14 arise in the region of this curve outer side 22.

Flange 14 is delimited on the sides by a Y-outer side 17 in each case. Mounting holes 18 for screwing flange 14 to manifold 3 are formed in the corners of the flange.

To reinforce flange 14, the elevation 19 presented in FIG. 4 is proposed within the context of the invention. This elevation 19 is located in first X-outer side 15, thus that X-outer side which is assigned to curve outer side 22.

An elevation radius ER is defined at elevation 19. On the sides, elevation 19 transitions into the two troughs 20. The two troughs 20 rise up to side elevations 21. Side elevations 21 form the corners of the rectangular base form and surround mounting holes 18.

The two troughs 20 each have a trough radius TR. An elevation width EB is defined parallel to the x-axis and extends from trough bottom to trough bottom. Elevation width EB is defined as a function of flange width FB. Flange width FB in turn likewise extends parallel to the x-axis.

In FIG. 4, a dashed auxiliary line is shown parallel to the x-axis and at the upper ends of the two channels 12. Flange thicknesses FS1, FS2, and FS3 to first X-outer side 15 are measured starting from this auxiliary line. First flange thickness FS1 extends up to the bottom of individual trough 20. Third flange thickness FS3 is defined up to the side elevations 21. Second flange thickness FS2 is defined in the center on the y-axis. FS1 is advantageously substantially smaller than FS2 and FS3. It is particularly provided that FS2 is at least 120%, in particular at least 140% of FS1.

Partition 13 has a thickness D. Thickness D is defined parallel to the x-axis and is measured at the thinnest point.

The individual channel 12 has a first Y-channel side 23. Partition 13 is formed between the two first Y-channel sides 23 of the two channels 12.

A second Y-channel side 24 lies opposite the first Y-channel side in the individual channel 12. Furthermore, the individual channel 12 is delimited by a first X-channel side 25 and a diametrically opposite second X-channel side 26. A first transition 27 is formed between first Y-channel side 23 and first X-channel side 25. A second transition 28 runs from first X-channel side 25 to second Y-channel side 24. A third transition 29 runs from second Y-channel side 24 to second X-channel side 26. A fourth transition 30 runs from second X-channel side 26 to first Y-channel side 23.

Within the context of the invention, it is particularly proposed that first transition 27 is to be newly configured corresponding to thermal load at flange 14. First transition 27 is, in comparison to fourth transition 30, more heavily loaded, as it faces curve outer wall 22 (see FIG. 1). Second and third transitions 28, 29 are configured with a relatively large third radius R3. Fourth transition 30 is configured with a relatively large fourth radius R4. In contrast, first transition 27 is configured by two radii, first radius R1 and second radius R2. The two curves forming radii R1, R2 are connected to one another via a connection 31. Connection 31 may be a straight line or a curve with a very large radius.

Connection 31 has a connection length L.

A width B of the individual channel 12 is measured at the widest point and parallel to the x-axis. A height H of the individual channel 12 is measured at the tallest point and parallel to the y-axis.

FIG. 4 further shows an angle α of connection 31 to the y-axis. In the embodiment shown, connection 31 is formed as a straight line. However, it is also possible to configure connection 31 as a curve with a large radius. In this case, angle α would be measured at the tangent. In this case, the tangent is used, which intersects the curve in the center of the curve length.

In the first embodiment, the two radii R1 and R2 are 12.5 mm. Thickness D is 11 mm. Elevation radius ER is 30 mm. Angle α is 62°.

In the first embodiment, flange 14 with the cross section of the two channels 12 is symmetrical with respect to the y-axis. FIG. 5 shows an asymmetrical flange according to the second embodiment. With the exception of R1, R2, and a, all sizes and elements are identical in the two embodiments. For the purpose of an overview, FIG. 5 shows only one half of flange 14.

The right channel 12 according to FIG. 5 corresponds to the right channel 12 from FIG. 4. The cross section of the left channel 14 in FIG. 5 is changed: the two radii R1' and R2' are 15 mm. The angle α' is 65°. All other lengths and radii correspond to the first embodiment. FIG. 5 shows by way of an embodiment that the two channels 12 may be configured differently and adjusted to the thermal loads. The following ratios have thereby proven to be advantageous.

R1' is 50% to 150%, in particular 65% to 135%, particularly preferably 75% to 125% of R1, wherein R1 and R1' differ preferably by at least 5%, particularly preferably by at least 10%.

R2' is 50% to 150%, in particular 65% to 135%, particularly preferably 75% to 125% of R2, wherein R2 and R2' differ preferably by at least 5%, particularly preferably by at least 10%.

α' is 80% to 120%, in particular 90% to 110%, particularly preferably 93% to 107% of α, wherein α and α' differ preferably by at least 1%, particularly preferably by at least 3%.

It is further preferably provided that first radius R1' is 65% to 150%, preferably 75% to 130%, particularly preferably 80% to 120% of second radius R2'.

In addition to the preceding written description of the invention, reference is explicitly made here to the graphic representation of the invention in FIGS. 1 to 5 to the supplemental disclosure thereof.

LIST OF REFERENCE NUMERALS

1 Exhaust gas supply arrangement
2 Exhaust gas turbocharger
3 Manifold
4 Internal combustion engine
5 Compressor
6 Compressor housing
7 Compressor wheel
8 Shaft
9 Turbine
10 Turbine housing
11 Turbine wheel
12 Channels
13 Partition
14 Flange
15 First X-outer side
16 Second Y-outer side
17 Y-outer side
18 Mounting holes
19 Elevation
20 Troughs
21 Side elevations
22 Curve outer side
23 First Y-channel side
24 Second Y-channel side
25 First X-channel side
26 Second X-channel side
27 First transition
28 Second transition
29 Third transition
30 Fourth transition
31 Connection
ER Elevation radius
FB Flange width
FS1-FS3 Flange thicknesses
D Thickness
R1 First radius
R2 Second radius
R3 Third radius
R4 Fourth radius
B Channel width
H Channel height

The invention claimed is:

1. An exhaust gas supply arrangement (1) to a turbine wheel (11) of an exhaust gas turbocharger (2), having a flange (14) for connecting to a manifold (3) of an internal combustion engine (4), an exhaust gas supply leading from the flange (14) to the turbine wheel (11), and a partition (13) which divides the exhaust gas supply into two channels (12), wherein, in a top view of the flange (14), a coordinate system is defined, the origin thereof lying in the center of the partition (13), the y-axis thereof following the partition (13) and the x-axis thereof being perpendicular to the y-axis, wherein the flange (14) has a rectangular base shape with two X-outer sides (15, 16) running parallel to the x-axis and two Y-outer sides (15, 16) running parallel to the y-axis, wherein at least one of the X-outer sides (15) has a reinforcement in the form of an elevation (19), and wherein the elevation (19) is formed in the center in the X-outer side (15).

2. The exhaust gas supply arrangement according to claim 1, wherein the exhaust gas supply arrangement is an integral component of a turbine housing (10) of the exhaust gas turbocharger (2).

3. The exhaust gas supply arrangement according to claim 1, wherein the flange (14) is asymmetrical with respect to the x-axis, and/or the flange (14) is asymmetrical with respect to the y-axis, and/or the individual channel (12) is asymmetrical with respect to each of the straight lines parallel to the y-axis, and/or the individual channel (12) is asymmetrical with respect to each of the straight lines parallel to the x-axis.

4. The exhaust gas supply arrangement according to claim 1, wherein the elevation (19) has an elevation radius (ER) from 10 to 50 mm.

5. The exhaust gas supply arrangement according to claim 1, wherein the elevation (19) has an elevation width (EB) perpendicular to the y-axis, wherein the flange (14) has a largest flange width (FB) perpendicular to the y-axis, and wherein the elevation width (EB) is 0.2 to 0.7 times the flange width (FB).

6. The exhaust gas supply arrangement according to claim 1, wherein at the flange (14), a thickness (D) of the partition (13) is defined at the thinnest point of the partition (13), wherein the thickness (D) is between 6 and 16 mm.

7. The exhaust gas supply arrangement according to claim 1, wherein each of the two channels (12) at the flange (14) is delimited by:

a first Y-channel side (23) is defined by the partition (13), a second Y-channel side (24), which lies diametrically opposite the first Y-channel side (23)

a first transition (27) from the first Y-channel side (23) into a first X-channel side (25), a second transition (28) from the first X-channel side (25) into the second Y-channel side (24), a third transition (29) from the second Y-channel side (24) into a second X-channel side (26), and a fourth transition (30) from the second X-channel side (26) into the first Y-channel side (23), wherein the first transition (27) has one curve with a first radius (R1) and one curve with a second radius (R2).

8. The exhaust gas supply arrangement according to claim 7, wherein the first transition (27) has a connection (31) between the two radii (R1, R2), wherein the connection (31) is a straight line or a curve, wherein the radius of the curve is substantially larger than the first radius (R1) and the second radius (R2).

9. The exhaust gas supply arrangement according to claim 7, wherein the first radius (R1) and/or the second radius (R2) lies between an upper limit and a lower limit, wherein the lower limit is 5 mm, and wherein the upper limit is 20 mm.

10. The exhaust gas supply arrangement according to claim 7, wherein the first radius (R1) is 65% to 150% of the second radius (R2).

11. The exhaust gas supply arrangement according to claim 7, wherein a width (B) of the individual channel (12) is defined at the widest point at the flange (14) parallel to the x-axis, wherein the width (B) is defined as a function of the first and second radii (R1, R2) by B=a*(R1+R2), where 0.8≤a ≤1.8.

12. The exhaust gas supply arrangement according to claim 7, wherein the first radius (R1) and/or the second radius (R2) lies between an upper limit and a lower limit, wherein the lower limit is 8 mm, and wherein the upper limit is 16 mm.

13. The exhaust gas supply arrangement according to claim 7, wherein the first radius (R1) and/or the second radius (R2) lies between an upper limit and a lower limit, wherein the lower limit is 10 mm, and wherein the upper limit is 14 mm.

14. The exhaust gas supply arrangement according to claim 7, wherein the first radius (R1) is 80% to 120% of the second radius (R2).

15. The exhaust gas supply arrangement according to claim 7, wherein a width (B) of the individual channel (12) is defined at the widest point at the flange (14) parallel to the x-axis, wherein the width (B) is defined as a function of the first and second radii (R1, R2) by B=a*(R1+R2), where 1.0≤a ≤1.7.

16. The exhaust gas supply arrangement according to claim 1, wherein the elevation (19) has an elevation radius (ER) from 15 to 45 mm.

17. The exhaust gas supply arrangement according to claim 1, wherein the elevation (19) has an elevation radius (ER) from 20 to 40 mm.

18. The exhaust gas supply arrangement according to claim 1, wherein the elevation (19) has an elevation width (EB) perpendicular to the y-axis, wherein the flange (14) has a largest flange width (FB) perpendicular to the y-axis, and wherein the elevation width (EB) is 0.3 to 0.5 times the flange width (FB).

19. The exhaust gas supply arrangement according to claim 1, wherein at the flange (14), a thickness (D) of the partition (13) is defined at the thinnest point of the partition (13), wherein the thickness (D) is between 8 and 14 mm.

* * * * *